(12) United States Patent
Kuchta et al.

(10) Patent No.: US 10,326,523 B1
(45) Date of Patent: Jun. 18, 2019

(54) OPTICAL MODULE AND LINK OPERATION ANALYSIS AND FAILURE PREDICTION

(71) Applicant: International Business Machines Corporation, Armonk, NY (US)

(72) Inventors: Daniel M. Kuchta, Patterson, NY (US); Philip A. Sciuto, LaGrange, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/843,020

(22) Filed: Dec. 15, 2017

(51) Int. Cl.
| | |
|---|---|
| H04B 10/079 | (2013.01) |
| H04B 10/077 | (2013.01) |
| H04B 10/40 | (2013.01) |
| G07C 3/02 | (2006.01) |
| G05B 23/02 | (2006.01) |

(52) U.S. Cl.
CPC .............. *H04B 10/077* (2013.01); *G07C 3/02* (2013.01); *H04B 10/40* (2013.01); *G05B 23/0232* (2013.01); *H04B 10/07955* (2013.01)

(58) Field of Classification Search
CPC ............................ H04B 10/075; H04B 10/079
See application file for complete search history.

(56) References Cited

U.S. PATENT DOCUMENTS

| | | | |
|---|---|---|---|
| 5,019,769 A * | 5/1991 | Levinson | ............. H01S 5/0014 372/31 |
| 7,593,640 B2 | 9/2009 | Hamoir | |
| 8,886,033 B2 | 11/2014 | Azadeh | |
| 9,356,690 B2 | 5/2016 | Kawanishi | |
| 9,369,200 B1 | 6/2016 | Schmidtke et al. | |
| 2004/0197101 A1* | 10/2004 | Sasser | ................ H04B 10/0799 398/117 |

(Continued)

FOREIGN PATENT DOCUMENTS

EP 1763929 B1 10/2013

OTHER PUBLICATIONS

Limberger, "Reliability of Optical Components and Devices in Communications Systems and Networks", 2003, 32 pages, https://cordis.europa.eu/pub/cost/docs/270anrep2003.pdf.

*Primary Examiner* — Shi K Li
(74) *Attorney, Agent, or Firm* — Cantor Colburn LLP; Tihon Poltavets (57) ABSTRACT

Embodiments include techniques for device analysis and failure prediction, the techniques include measuring or collecting parametric data of the device at a configurable interval, wherein the parametric data includes one or more parameters, and receiving operating limits for the parametric data based on specifications or characteristics for the device. The techniques also include determining a trend of the measured or collected parametric data of the device, and filtering noise from the trend based at least in part on at least one of other devices exhibiting a deviation exhibited by the device or system state changes associated with system log files. The techniques include identifying a failure stage of the device based on at least one of the trend or the received operating limits, and transmitting a notification of a predicted failure based at least in part on the identification.

17 Claims, 4 Drawing Sheets

(56) References Cited

U.S. PATENT DOCUMENTS

| | | | |
|---|---|---|---|
| 2012/0023041 A1* | 1/2012 | Kariv | G06F 11/3447 706/12 |
| 2015/0032388 A1 | 1/2015 | Nakagawa | |
| 2015/0243155 A1* | 8/2015 | Xiong | G08B 21/182 398/135 |

* cited by examiner

| Stage | Bias Current | Optical Power |
|---|---|---|
| Stage 0 | Normal | Normal |
| Stage 1 | Increased | Constant |
| Stage 2 | Max | Constant |
| Stage 3 | Max | Decreasing |
| Stage 4 | Max | 0 |

OPTICAL MODULE AND LINK OPERATION ANALYSIS AND FAILURE PREDICTION

BACKGROUND

The present invention generally relates to optical modules, and more specifically, to optical module analysis and failure prediction.

Digital communications can be exchanged using a variety of different protocols and techniques. For example, data can be exchanged over wireless mediums and wired mediums. Wireless communications can be implemented using protocols such as Wi-Fi, Bluetooth, and near-field communication (NFC) to exchange data wirelessly while wired communications can exchange data over copper cables and optical fibers. Each type of communication requires an interface, equipment, and/or modules to transmit and receive the data. For example, when communicating over a fiber optic medium, an optical module is used to convert the digital signals carrying the data. The reliability of the equipment used to transmit and receive these signals play a critical role in ensuring the proper signals are ultimately received. Digital communications are widely used in business enterprises and personal everyday life, where any disruption can affect the productivity and/or convenience by those impacted.

SUMMARY

Embodiments of the present invention are directed to a computer-implemented method for optical module analysis and failure prediction. A non-limiting example of the computer-implemented method includes measuring or collecting parametric data of the device at a configurable interval, wherein the parametric data includes one or more parameters, and receiving operating limits for the parametric data based on specifications or characteristics for the device. The computer-implemented method also includes determining a trend of the measured or collected parametric data of the device, and filtering noise from the trend based at least in part on other devices exhibiting a deviation exhibited by the device and/or based on a known state change of a system. The computer-implemented method includes identifying a failure stage of the device based on at least one of the trend or the received operating limits, and transmitting a notification of a predicted failure based at least in part on the identification.

Embodiments of the present invention are directed to a system for optical module analysis and prediction. A non-limiting example of the system includes a storage medium, where the storage medium being coupled to a processor, and the processor configured to measure or collect parametric data of the device at a configurable interval, wherein the parametric data includes one or more parameters, and receive operating limits for the parametric data based on specifications for the device. The processor is configured to determine a trend of the measured or collected parametric data of the device, and filter noise from the trend based at least in part on other devices exhibiting a deviation exhibited by the device and/or based on a known state change of the system. The processor is configured to identify a failure stage of the device based on at least one of the trend or the received operating limits, and is configured to transmit a notification of a predicted failure based at least in part on the identification.

Embodiments of the invention are directed to a computer program product for optical module analysis and prediction, the computer program product comprising a computer readable storage medium having program instructions embodied therewith. The program instructions are executable by a processor to cause the processor to perform a method. A non-limiting example of the method includes measuring or collecting parametric data of the device at a configurable interval, wherein the parametric data includes one or more parameters, and receiving operating limits for the parametric data based on specifications for the device. The computer-implemented method also includes determining a trend of the measured or collected parametric data of the device, and filtering noise from the trend based at least in part on other devices exhibiting a deviation exhibited by the device. The computer-implemented method includes identifying a failure stage of the device based on at least one of the trend or the received operating limits, and transmitting a notification of a predicted failure based at least in part on the identification.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, the optical modules used in communications include one or more components. These components include but are not limited to laser diodes and photodiodes. In other embodiments, different components can be used in the optical modules. The laser diode can receive a control voltage and power supply voltage. The laser diode is used to convert the electrical signal into an optical signal which can be output through an optical cable to an optical network. The photodiode, receiving a power supply voltage and a control voltage, converts the optical signal into an electrical signal.

Also, there are different types of optical modules used in communication. For example, there are independent passive cables, active optical cables, and transceivers. The characteristics of the optical modules and or components within the optical module can be monitored to analyze the reliability of the optical modules. The various parameters provide strong indicators of a properly functioning component for transmitting communication signals (the light is weak or fails to transmit data) and used to predict when the failure of the component will occur. The parameters can be analyzed over time and correlated to various stages of wear and/or failure. The techniques are not limited to optical modules and other devices, components, systems, etc. can be monitored and analyzed.

Devices and components can function safely "out of spec" beyond the life expectancy. Therefore, replacing devices and/or components prior to failure can prove to be unnecessary and costly. Similarly, if the devices and/or components are not timely replaced, downtime can result in a failing component. Premature and/or false predictions can increase repair actions and service costs. The techniques described herein provide techniques that obviate the replacement of components based solely on a maintenance schedule when the components in use still have usable life remaining. This technique allows for replacing components based on the current performance and condition of the component regardless of a maintenance schedule for the device.

Turning now to an overview of the aspects of the invention, one or more embodiments of the invention address the above-described shortcomings of the prior art by providing a technique for identifying stages of operation based on parameter ranges for optics operation and collect raw data, remotely, from systems in the manufacturing environment and/or in the field environment. In addition, the techniques are developed to track and analyze data over time to accurately identify poor performing conditions and modules before these modules actually fail by identifying different stages of operation.

One or more techniques described herein provide a method for determining the reliability for predicting the health of an optical component used in communication. The laser bias current and the power output provide a correlation to the health and remaining usable life of the optical components.

The above-described aspects of the invention address the shortcomings of the prior art by implementing a technique that analyzes the current status of an optical module based on measured parameters and determined parameter ranges to identify a stage of failure of the optical module. In addition, the history of the device that has been collected and stored over time can be used in the analysis. Also, the manufacturing test data for the device can be used. It is to be understood that a combination of the above and/or different information can be used to predict the health of the device.

Figure 1:
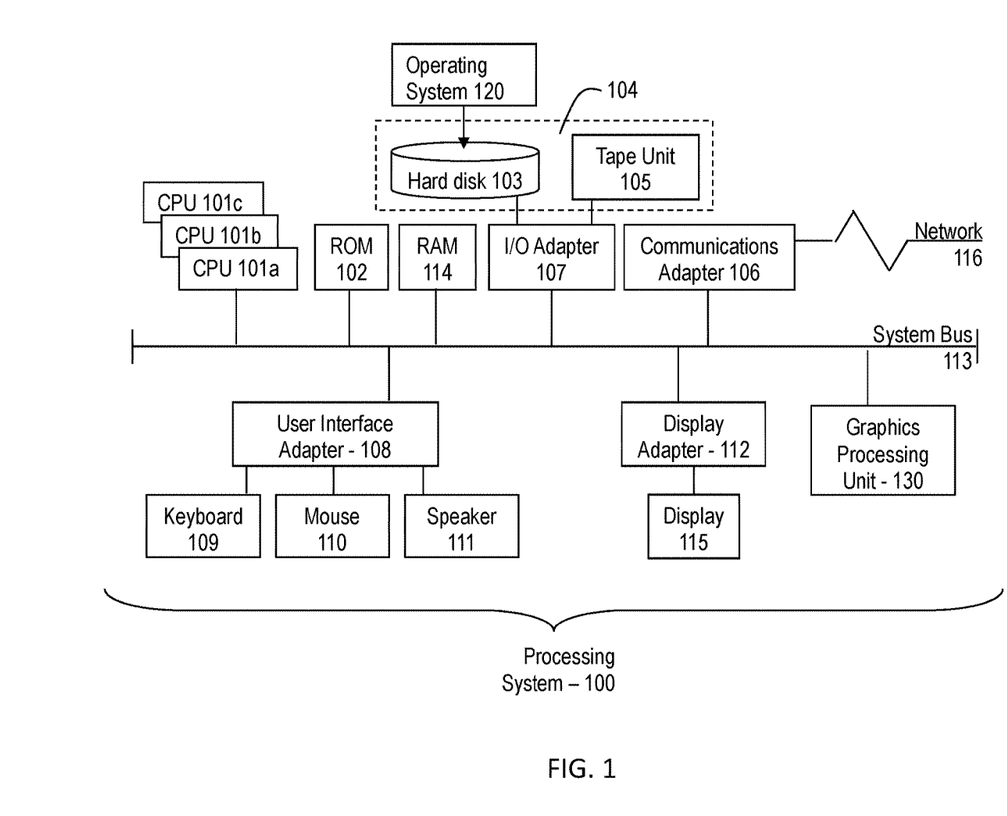
FIG. 1 is a block diagram illustrating one example of a processing system for practice of the teachings herein.

Turning now to a more detailed description of aspects of the present invention, there is shown an embodiment of a processing system 100 for implementing the teachings herein. In this embodiment, the system 100 has one or more central processing units (processors) 101*a*, 101*b*, 101*c*, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component such as a solid state device. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit. It is to be understood that other devices such as cameras, microphones, etc. can implemented into system 100.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
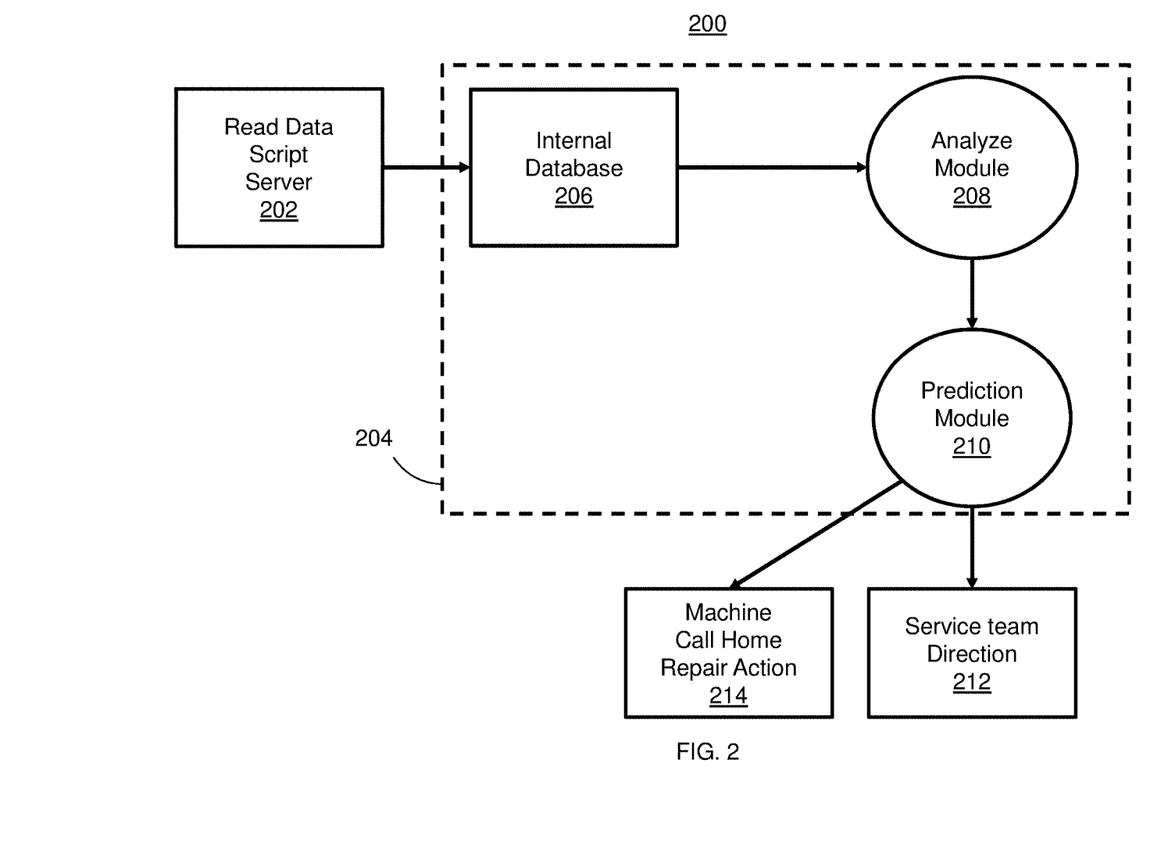
FIG. 2 is a system for optical module analysis and prediction in accordance with one or more embodiments.

Now referring to FIG. 2, a system 200 for optical module analysis and prediction is shown. The system 200 can be implemented in the system 100 of FIG. 1 or can be implemented using one or more components of FIG. 1. System 200 as shown includes a server 202. In one or more embodiments, the server 202 is configured to process data received from one or more sources and can be located locally or remote to the system core 204. For example, operational data and/or parameters can be transmitted and received by the server 202 from remote systems such as manufacturing facilities or service centers over a network.

The system 200 also includes a core 204 which has one or more components. The core 204 includes an internal database 206, analysis module 208, and prediction module 210. It is to be understood that other elements and different arrangements can be used in the core, such as processing modules, memories, interfaces, etc.

In FIG. 2, the internal database is coupled to the server 202 and the analysis module 208. In one or more embodiments, the internal database 206 is a data mart or a big data warehouse that can store large amounts of data for analysis.

In one or more embodiments, the internal database 206 stores data for devices and their operating parameters. The data can be received locally or remotely over a network such as being stored in a data center or a cloud. In one or more embodiments, the analysis is performed by a processor located in a separate location from where the data is stored and where the stored data is coupled to a data collection processor. In this particular embodiment, the data collection processor does not perform the analysis described herein. In addition, the internal database 206 can store data including the operational limits for the respective devices and their parameters based on data sheets or specification provided by the supplier and/or manufacturer. Also, the typical operating characteristics of the devices can be obtained by lab characterizations or field measurements. The history of normal and failed devices/components can be observed and used. It is also to be understood that the characteristics for an existing generation or an earlier generation can be used in the analysis. The internal database 206 can store failure information associated with respective devices and/or components. In this non-limiting configuration, the internal database receives data from the server 202 at a configurable interval, such as hourly, daily, weekly, etc.

The analysis module 208 receives data from the internal database 206 and process the data to determine the operating stage for a device. In an embodiment, the analysis module 208 receives data during runtime and reads the performance data of a device from a system register of the device being monitored. In one or more embodiments, the analysis is performed by the analysis module 208 on a periodic basis. For example, the analysis module 208 performs the analysis of the data from the internal database 206 on a weekly, monthly, yearly, etc. interval. The details of the analysis are provided in FIG. 3.

The analysis module 208 is coupled to the prediction module 210, where the prediction module 210 determines the progression of failure for the device. For example, the analysis correlates the condition of various parameters and conditions to the characteristics of failure modes. The data is captured and studies in a large enough interval to identify stages that occur prior to failure.

The prediction module 210 is configured to communicate with other systems such as a machine call home repair action system 214 and service team direction 212. In other embodiments, the prediction module 210 can be coupled to and communicate with external systems.

Figure 3:
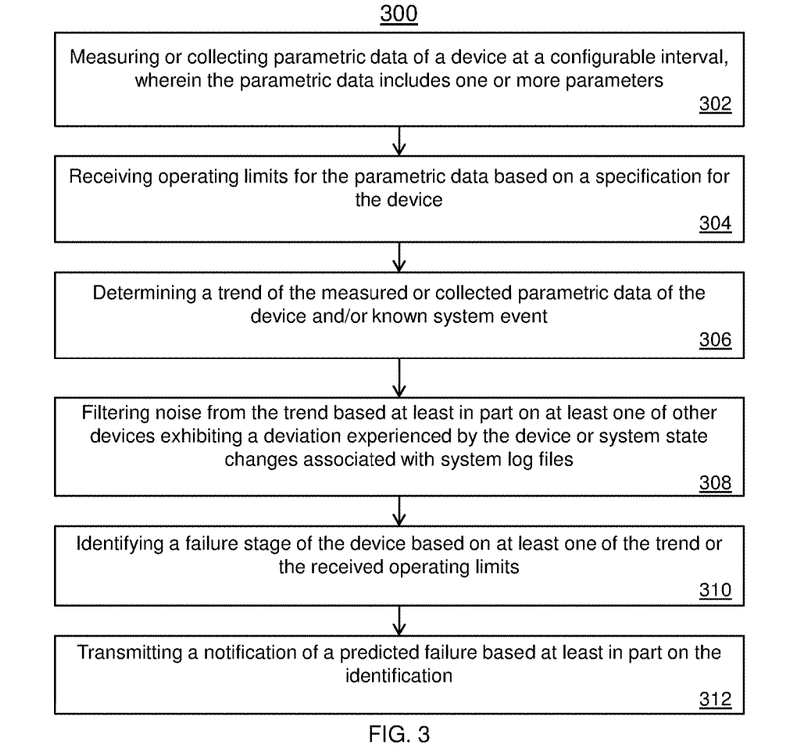
FIG. 3 depicts a flow diagram for performing optical module analysis and prediction in accordance with one or more embodiments.

Now referring to FIG. 3 a method 300 for optical module analysis and prediction is shown. Block 302 provides measuring or collecting parametric data of a device at a configurable interval, wherein the parametric data includes one or more parameters. In the optical module example, the measured parameters can include one or more of a voltage, laser bias current, temperature, optical power, laser output power, or photodiode input power. In one or more embodiments, the parameters are collected by the device's internal microcontroller and stored within the device. The stored data can be collected and used in the analysis and prediction.

Block 304 provides receiving operating limits or characteristics for the parametric data based on a specification for the device. In one or more embodiments, the specification can be provided by a data sheet for a component that describes the operating limits and acceptable ranges for each of the parameters for the device. In another embodiment, characteristics of normal and failing devices are used including those characteristics that are based on lab measurements and field observations.

Block 306 provides determining a trend of the measured or collected parametric data of the device. In some embodiments, the entire field history of the device's parametric data is analyzed to determine a trend over a period of time.

Block 308 provides filtering noise from the trend based at least in part on other devices exhibiting a deviation experience by the device. In one or more embodiments, the analysis described herein filters out and removes the noise from the trend data. The filtering can be based on other devices in the same system are compared to remove system related effects which appear as a failure state because of the large deviations in the parametric data. For example, the system might shut off the data stream prior to performing a reboot operation, where shutting off the data stream tends to generate large fluctuations in the parametric data such as the bias current or optical power. By collecting and observing other optical modules in the same system, it can be determined that the other devices experienced the large fluctuation at the same time as the current device being analyzed. Therefore, the large fluctuation and deviation in the parametric data can be ruled out as relating to a failure and the anomalies in this period can be ignored. In one or more embodiments, system logs can be correlated with system state changes to aid in noise filtering, when the systems are small and there are not enough other devices to filter the noise.

Block 310 provides identifying a failure stage based on at least one of the trend or the operating limits. In the example described above, the large deviation can be correlated to the system or maintenance log files and not a failure stage. In one or more embodiments, the measured or collected parametric data is compared to the operating limits or typical characteristics to identify a failure stage of the device. The measured parametric data can be polled to determine which parameters have exceeded their respective operating limits or operating outside of typical operating characteristics. For example, an optical module can have its bias current specified at a minimum 3 mA, a maximum 9 mA, and normal operating point at 5 mA. The bias current that began operating at 5 mA but is later observed at operating at 7 mA with a consistent increasing trend over time will be flagged as Stage 1, even though 7 mA is within the minimum and maximum range.

Block 312 provides transmitting a notification of a predicted failure based at least in part on the identification. In one or more embodiments, the notification is transmitted in a stage prior to complete failure.

Figure 4:
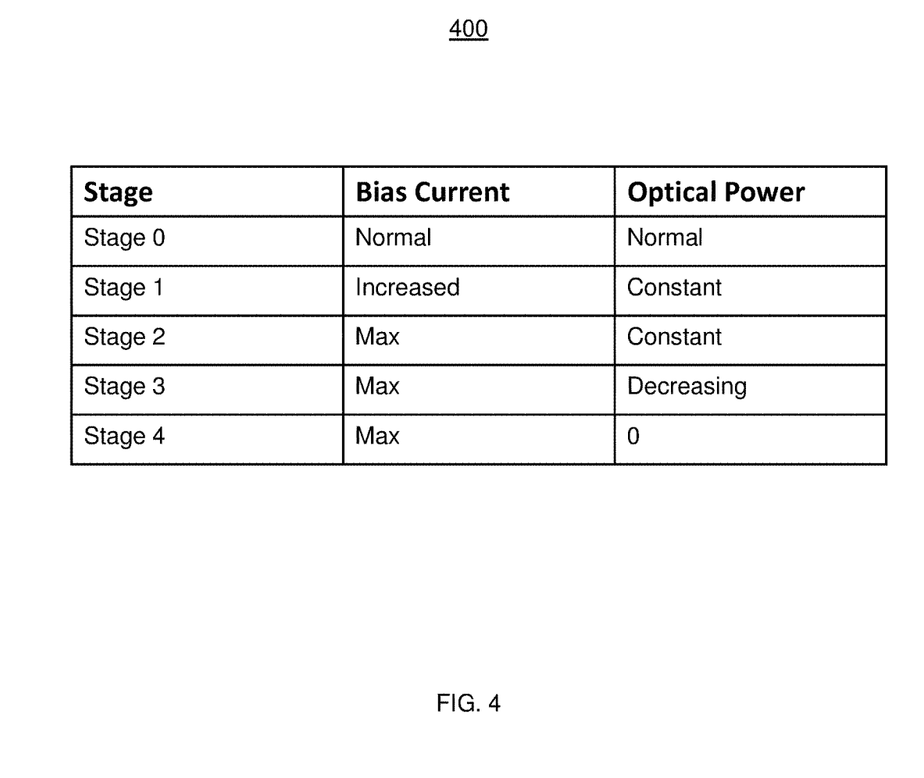
FIG. 4 depicts a table used in an optical module analysis and prediction in accordance with one or more embodiments.

Now referring to FIG. 4, a table 400 in accordance with one or more embodiments is shown. The table 400 is used to identify the parameters conditions associated with each stage approaching failure for an optical module. Table 400 includes three headings "Stage," "Bias Current," and "Power" to organize the data. It is to be understood that the table is not limiting to storing the information presented but can be modified based on the type of device and parameters being monitored. For example, additional parameters can be monitored to provide granular indicia of failure such as voltage, temperature, utilization, etc. Similarly, more stages can be used to identify stages that indicate a particular device is approaching failure.

FIG. 4 provides Stage 0 where the bias current and optical output power of an optical module is operating at a normal operating level with no signs of degradation. Stage 1 is determined based on the first parameter, bias current, has increased beyond the normal operating level or characteristics or an observed normal field operating characteristics and the second parameter, optical power, is at a constant or steady level. For example, an initial reading can be measured or can be determined based on a specification or data sheet for the particular device. If it is subsequently determined that the increase in bias current is above a deviation, Δ %, of the initial reading, and the output power of the optical module has remained constant, the optical module is operating in the Stage 1. Analysis is also performed to determine if the deviation above Δ % is a point deviation (system generated or glitch) or part of an increasing trend over time. The deviation Δ can be determined based on the type of laser, the system noise level, and/or the range between a maximum and minimum level. For example, a noisy system with a factor of 2.5 between a minimum and maximum deviation Δ may be set to 20%. It is to be understood that different deviations can be used and other factors can be used to determine the deviation.

Stage 2 is determined based on the bias current parameter being measured at a maximum level and the optical power output parameter has remained constant. This scenario indicates that more bias current is required to achieve the normal output power level. In one or more embodiments, in order for the device to have entered stage 2, the measured readings for the first and second parameters must be in their current state for at least 3 readings. In a non-limiting example, the readings are taken weekly, therefore, by this example, the current state for the parameters are present for 3 weeks. In other embodiments, a different number of readings or different interval can be used to determine when the second stage has been entered.

Stage 3 is determined based on the bias current parameter operating at the maximum allowable level and the output power parameter is decreasing. In this scenario, the bias current can longer compensate for the decreasing output power and indicates the module is experiencing some failure. During stage 3, a notification can be transmitted to a user, service, external system, etc. to indicate that a component should be timely replaced to prevent any disruption in service and/or downtime.

Stage 4 is determined based on the bias current parameter operating at a maximum level and the output power parameter is 0 W or a fault condition is asserted. This stage indicates a total failure of the device, where the device no longer functional. The first time a reading indicates this condition, the device can be declared to have failed. If a component executes each stage in succession, then the failure of the device can be accurately predicted prior to Stage 4. This allows time to take corrective action, perform scheduled maintenance, and/or replace components prior to failure. The characteristics of the drop in optical power are fit to a linear or polynomial model and extrapolated out in time to predict when Stage 4 will occur or when the optical power level will drop below a level where the link can still function. The selection of a degradation model is based on a combination of measured characteristics and the type of device. The techniques described herein provide a method to identify and replace devices prior to reaching stage 4 but avoids prematurely replacing devices as devices can operate in stage 3 for a duration of time. In another embodiment, the stage 4 can exhibit a fault condition when it is asserted. In a non-limiting example, in the event the optical power cannot be maintained within certain limits, the module will shut down the bias current and assert the fault condition.

It is to be understood that different components can have different parameters and operating ranges for those parameters to be monitored. For example, components from different suppliers can have different operating conditions, such as minimum and maximum operating voltages, temperatures, currents, etc. In one or more embodiments, the data sheets or Multi-Source Agreement (MSA) for the various parts from the suppliers are used to determine the functional limits and operating ranges of the components. The information provided by the device specifications can be integrated into the analysis. In another embodiment, the analysis can use field characteristics of a normal ensemble of parts and/or observed failure traits.

The techniques described herein provide a method for early and accurate prediction to save service cost, improve customer satisfaction, and reduces unscheduled repair actions and also obviates the need to replace parts that have yet to fail.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for device analysis and failure prediction, the computer-implemented method comprising:
   measuring or collecting parametric data of the device at a configurable interval, wherein the parametric data includes one or more parameters;
   receiving operating limits for the parametric data based on specifications or operating characteristics for the device;
   determining a trend of the measured or collected parametric data of the device;
   filtering noise from the trend based at least in part on at least one of other devices exhibiting a deviation exhibited by the device or system state changes associated with system log files;
   identifying a failure stage of the device based on at least one of the trend or the received operating limits, wherein identifying the failure stages comprises:
      determining a first stage based at least in part on measuring a first parameter increased by a configurable threshold and a second parameter is at a constant or steady value;
      determining a second stage based at least in part on measuring the first parameter is at a maximum and the second parameter is a constant value, wherein the maximum is defined by a specification or known characteristic for the device;
      determining a third stage based at least in part on measuring the first parameter is at a maximum and the second parameter has decreased from the constant value; and
      determining a fourth stage based at least in part on the first parameter is at the maximum and the second parameter is at a minimum value; and
   transmitting a notification of a predicted failure based at least in part on the identification.

2. The computer-implemented method of claim 1, further comprising: storing manufacturing test data and field history data of the device over time.

3. The computer-implemented method of claim 1, wherein a number of failure stages is based on a number of parametric data and characteristics over time and the device being monitored.

4. The computer-implemented method of claim 1, wherein the determining the second stage is based on the measurement for the first parameter having exceeded the operating limits for a threshold number of readings, wherein one reading is performed in the configurable interval.

5. The computer-implemented method of claim 1, wherein the first parameter is a laser bias current supplied to the device and the second parameter is an output optical power of the device.

6. The computer-implemented method of claim 5, further comprising: predicting a failure based on fitting the output optical power of the device over a linear function or polynomial function to determine a degradation in performance.

7. The computer-implemented method of claim 1, further comprising: responsive to identifying the device is operating in the third stage, transmitting the notification of predicted failure.

8. The computer-implemented method of claim 1, wherein the parametric data includes one or more of a voltage, laser bias current, temperature, optical power, laser output power, or photo diode input power.

9. The computer-implemented method of claim 1, wherein the device is an active optical cable, a pluggable optical device, on-board optical module, or an on-package optical module.

10. The computer-implemented method of claim 1, wherein the parametric data is received from system registers or storage during runtime for a system using optical modules.

11. A system for device analysis and failure prediction, the system comprising:
    a storage medium, the storage medium being coupled to a processor;
    the processor configured to:
       measure or collect parametric data of the device at a configurable interval, wherein the parametric data includes one or more parameters;
       receive operating limits or operating characteristics for the parametric data based on specifications for the device;
       determine a trend of the measured or collected parametric data of the device;
       filter noise from the trend based at least in part on other devices exhibiting a deviation exhibited by the device;
    identify a failure stage of the device based on at least one of the trend or the received operating limits, wherein identifying the failure stages comprises the processor further configured to:
       determine a first stage based at least in part on measuring a first parameter increased by a configurable threshold and a second parameter is at a constant value;
       determine a second stage based at least in part on measuring the first parameter is at a maximum and the second parameter is a constant value, wherein the maximum is defined by a specification or known characteristics for the device;
       determine a third stage based at least in part on measuring the first parameter is at a maximum and the second parameter has decreased from the constant value; and
       determine a fourth stage based at least in part on the first parameter is at the maximum and the second parameter is at a minimum value or a fault condition is asserted; and
    transmit a notification of a predicted failure based at least in part on the identification.

12. The system of claim 11, wherein the determining the second stage is based on the measurement for the first parameter having exceeded the operating limits for a threshold number of readings, wherein one reading is performed in the configurable interval.

13. The system of claim 11, wherein the first parameter is a laser bias current supplied to the device and the second parameter is an output optical power of the device.

14. The system of claim 11, wherein the processor is further configured to responsive to identifying the device is operating in the third stage, transmit the notification of the predicted failure.

15. A computer program product for device analysis and failure prediction, the computer program product comprising:
a computer readable storage medium having stored thereon program instructions executable by a processor to cause the processor to:
measure or collect parametric data of the device at a configurable interval, wherein the parametric data includes one or more parameters;
receive operating limits or characteristics for the parametric data based on specifications for the device;
determine a trend of the measured or collected parametric data of the device;
filter noise from the trend based at least in part on other devices exhibiting a deviation exhibited by the device;
identify a failure stage of the device based on at least one of the trend or the received operating limits, wherein identifying the failure stages comprises:
determining a first stage based at least in part on measuring a first parameter increased by a configurable threshold above a trend of increase over time and a second parameter is at a constant value;
determining a second stage based at least in part on measuring the first parameter is at a maximum and the second parameter is a constant value, wherein the maximum is defined by a specification for the device;
determining a third stage based at least in part on measuring the first parameter is at a maximum and the second parameter has decreased from the constant value; and
determining a fourth stage based at least in part on the first parameter is at the maximum and the second parameter is at a minimum value or fault asserted; and
transmit a notification of a predicted failure based at least in part on the identification.

16. The computer program product of claim 15, wherein the determining the second stage is based on the measurement for the first parameter having exceeded the operating limits for a threshold number of readings, wherein one reading is performed in the configurable interval; and
wherein determining the third stage, calculating the expected failure point, and transmit the notification of the predicted failure.

17. The computer program product of claim 15, wherein the first parameter is a laser bias current supplied to the device and the second parameter is an output optical power of the device.

* * * * *